(12) United States Patent
Ando et al.

(10) Patent No.: US 9,287,058 B2
(45) Date of Patent: Mar. 15, 2016

(54) ACCUMULATOR DEVICE

(75) Inventors: Nobuo Ando, Nakakoma-gun (JP); Teruaki Tezuka, Kofu (JP); Yuu Watanabe, Hokuto (JP); Makoto Taguchi, Kai (JP); Kenji Kojima, Kofu (JP); Takashi Chiba, Nirasaki (JP); Hirobumi Suzuki, Nirasaki (JP)

(73) Assignee: JM Energy Corporation, Hukuto (JP)

( * ) Notice: Subject to any disclaimer, the term of this patent is extended or adjusted under 35 U.S.C. 154(b) by 246 days.

(21) Appl. No.: 14/005,472

(22) PCT Filed: Feb. 27, 2012

(86) PCT No.: PCT/JP2012/054701
§ 371 (c)(1),
(2), (4) Date: Sep. 16, 2013

(87) PCT Pub. No.: WO2012/127991
PCT Pub. Date: Sep. 27, 2012

(65) Prior Publication Data
US 2014/0002959 A1 Jan. 2, 2014

(30) Foreign Application Priority Data

Mar. 18, 2011 (JP) .................................. 2011-060192
Sep. 26, 2011 (JP) .................................. 2011-209125

(51) Int. Cl.
| | |
|---|---|
| *H01G 9/00* | (2006.01) |
| *H01G 11/26* | (2013.01) |
| *H01G 11/22* | (2013.01) |
| *H01M 4/02* | (2006.01) |
| *H01M 10/04* | (2006.01) |
| *H01M 10/42* | (2006.01) |
| *H01G 11/50* | (2013.01) |
| *H01G 11/06* | (2013.01) |
| *H01G 11/70* | (2013.01) |
| *H01M 10/0525* | (2010.01) |

(52) U.S. Cl.
CPC .............. *H01G 11/26* (2013.01); *H01G 11/06* (2013.01); *H01G 11/22* (2013.01); *H01G 11/50* (2013.01); *H01G 11/70* (2013.01); *H01M 4/02* (2013.01); *H01M 10/0431* (2013.01); *H01M 10/42* (2013.01); *H01M 10/0525* (2013.01); *H01M 2004/021* (2013.01); *H01M 2010/4292* (2013.01); *Y02E 60/13* (2013.01); *Y02T 10/7011* (2013.01); *Y02T 10/7022* (2013.01)

(58) Field of Classification Search
CPC .................................. H01G 9/00; H01G 11/26
USPC ......... 361/502, 503–504, 509–512, 516–519, 361/523–525, 528–529
See application file for complete search history.

(56) References Cited

U.S. PATENT DOCUMENTS

| | | | |
|---|---|---|---|
| 5,953,204 A | 9/1999 | Suhara et al. | |
| 8,724,292 B2 * | 5/2014 | Taguchi et al. | ............... 361/502 |
| 2006/0057433 A1 | 3/2006 | Ando et al. | |
| 2007/0215926 A1 | 9/2007 | Mitsuda et al. | |
| 2009/0246626 A1 | 10/2009 | Tasaki et al. | |
| 2010/0027195 A1 | 2/2010 | Taguchi et al. | |
| 2011/0041324 A1 | 2/2011 | Ando et al. | |
| 2012/0293914 A1 | 11/2012 | Nansaka et al. | |
| 2013/0017438 A1 | 1/2013 | Taguchi et al. | |

FOREIGN PATENT DOCUMENTS

| | | |
|---|---|---|
| CN | 1735949 A | 2/2006 |
| CN | 101310350 A | 11/2008 |
| JP | 2007 173615 | 7/2007 |
| WO | 2004 059672 | 7/2004 |

OTHER PUBLICATIONS

International Search Report Issued May 29, 2012 in PCT/JP12/054701 filed Feb. 27, 2012.
Extended European Search Report issued Aug. 27, 2014 in Patent Application No. 12760198.7.
Office Action issued Sep. 24, 2015, in Japanese Patent Application No. 2013-505865 (with English-language Translation).

* cited by examiner

*Primary Examiner* — Nguyen T Ha
(74) *Attorney, Agent, or Firm* — Oblon, McClelland, Maier & Neustadt, L.L.P.

(57) ABSTRACT

An accumulator device which provides a high energy density and high output power is provided. The accumulator device (D) includes a positive electrode in which a positive electrode layer (A) is formed, a negative electrode in which a negative electrode layer (B) is formed, and an electrolytic solution (C). The accumulator device is characterized by satisfying that $1.02 \leq W_A/W_B \leq 2.08$ and that $390 \, \mu m \leq T_A \leq 750 \, \mu m$, where $W_A$ is the weight of the positive electrode layer (A), $W_B$ is the weight of the negative electrode layer (B), and $T_A$ is the thickness of the positive electrode in which the positive electrode layer (A) is formed.

12 Claims, No Drawings

ACCUMULATOR DEVICE

TECHNICAL FIELD

The present invention relates to an accumulator device which provides improved properties such as high voltage, high energy density and high output power.

BACKGROUND ART

With environmental problems coming to the fore, accumulator devices have been intensively developed which are used in storage systems for clean energy produced by solar power generation or wind power generation as well as for electric vehicles or hybrid electric vehicles which are replacing gasoline-powered vehicles. Furthermore, in recent years, while on-board systems or devices such as power window systems or IT associated devices have been improved to provide higher performances and functions, there is a need for development of a new accumulator device which provides higher energy density and higher output power properties.

In this context, as an accumulator device conforming to the requirements for higher energy density and higher output power properties, attention has been recently focused on an accumulator device, called "a hybrid capacitor," for which the principles of accumulation of electric charges in the lithium ion secondary battery and the electric double layer capacitor are combined. As such a hybrid capacitor, an accumulator device was suggested which employed activated carbon to form the positive electrode and a carbonaceous material, capable of occluding and deoccluding lithium ions, to form the negative electrode. The accumulator device was capable of providing a high energy density by allowing the negative electrode to occlude or carry lithium ions (also referred to as "doping") in advance chemically or electrochemically and thereby lowering the potential of the negative electrode (for example, see Patent Literature 1).

In this context, a hybrid capacitor-type accumulator device was suggested which was to provide a higher energy density (for example, see Patent Literature 2). However, although a high performance was expected, the hybrid capacitor-type accumulator device mainly provided an energy density of 8 to 16 Wh/Kg due to an excessive weight of the current collector, the separator and the electrolytic solution. Furthermore, the accumulator device had a problem that an increase in the energy density caused degradation in service life, thus making it difficult to put the accumulator device to practical use so as to provide a high energy density.

CITATION LIST

Patent Literature

Patent Literature 1: Japanese Patent Application Laid-Open No. Hei. 8-107048
Patent Literature 2: Japanese Patent No. 4015993

SUMMARY OF INVENTION

Technical Problem

The present invention has been made on the basis of the foregoing circumstances and has as its object the provision of an accumulator device which provides a high energy density and high output power.

Solution to Problem

An accumulator device (D) of the present invention includes a positive electrode in which a positive electrode layer (A) is formed, a negative electrode in which a negative electrode layer (B) is formed, and an electrolytic solution (C).

The accumulator device is characterized by satisfying that $1.02 \leq W_A/W_B \leq 2.08$ and that $390\,\mu m \leq T_A \leq 750\,\mu m$, where $W_A$ is the weight of the positive electrode layer (A), $W_B$ is the weight of the negative electrode layer (B), and $T_A$ is the thickness of the positive electrode in which the positive electrode layer (A) is formed.

Furthermore, the accumulator device of the present invention is characterized by satisfying that $0.19 \leq (W_A+W_B)/W_D \leq 0.28$, and $1.58 \leq W_C/(W_A+W_B) \leq 1.85$, where $W_D$ is the weight of the accumulator device (D) and $W_C$ is the weight of the electrolytic solution (C).

Furthermore, the accumulator device of the present invention is characterized by satisfying that $500 \leq \sqrt{(T_A^2 \times W_A/W_B)} \leq 1000$.

Furthermore, the accumulator device of the present invention is characterized by satisfying that $100\,\mu m \leq T_B \leq 300\,\mu m$, where $T_B$ is the thickness of the negative electrode in which the negative electrode layer (B) is formed.

Furthermore, the accumulator device (D) of the present invention is characterized by having a laminated-type electrode unit or a wound-type electrode unit.

It is preferable that the accumulator device (D) constructed as such has a laminated-type electrode unit or a wound-type electrode unit in which the positive electrode and the negative electrode are laminated or wound with a separator interposed therebetween; and the positive electrode has a plurality of current collectors with holes penetrating across the front and back surfaces, the plurality of current collectors being laminated with the positive electrode layer interposed therebetween.

Furthermore, the accumulator device of the present invention is preferred as a lithium ion capacitor.

Advantageous Effects of Invention

According to the present invention, it is possible to provide an accumulator device which provides a higher energy density and higher output power by constructing the accumulator device under the aforementioned conditions.

DESCRIPTION OF EMBODIMENTS

The accumulator device of the present invention is also applicable, for example, to the hybrid capacitor-type lithium ion capacitor, the lithium secondary battery and the electric double layer capacitor.

Now, taking the lithium ion capacitor as an example, a description will be made to the accumulator device (D) of the present invention.

The lithium ion capacitor basically has an electrode unit (a laminated-type electrode unit or a wound-type electrode unit) in an outer container, the electrode unit having the positive electrode and the negative electrode alternately laminated or wound with a separator interposed therebetween. Outer containers, such as a cylindrical, square and laminated type, may be employed as appropriate without being limited to a particular one.

Here, the lithium ion capacitor may have a laminated-type electrode unit which is configured to have the positive electrode and the negative electrode alternately laminated with a separator interposed therebetween. In this case, the laminated-type electrode unit is typically configured in a manner such that the number of negative electrodes constituting the electrode unit is greater than the number of positive electrodes, so that each of the negative electrodes constituting the laminated-type electrode unit is opposite to one or more positive electrodes, with the outermost layer being a negative electrode.

In the specification, the term "doping" means occluding, adsorption, or insertion, and in a broad sense, refers to the phenomenon in which at least one of the lithium ion and anion enters the positive electrode active material, or alternatively, the phenomenon in which the lithium ion enters the negative electrode active material. On the other hand, the term "dedoping" means desorption or release, and refers to the phenomenon in which the lithium ion or anion is desorbed from the positive electrode active material or the phenomenon in which the lithium ion is desorbed from the negative electrode active material.

For example, as a method of doping the lithium ion into at least one of the negative electrode and the positive electrode in advance, used is a method of disposing a lithium ion supply source such as a metal lithium as a lithium electrode in a capacitor cell so as to dope the lithium ion by the electrochemical contact of at least one of the negative electrode and the positive electrode to the lithium ion supply source.

In the lithium ion capacitor according to the present invention, it is also possible to uniformly dope the lithium ion into at least one of the negative electrode and the positive electrode by locally disposing the lithium electrode in the cell for electrochemical contact therebetween.

Thus, even when the positive electrode and the negative electrode are laminated or further wound to construct a large-capacity cell, the lithium electrode can be disposed on part of the cell located on the outermost circumference or the outermost layer, thereby smoothly and uniformly doping the lithium ion into at least one of the negative electrode and the positive electrode.

The lithium ion capacitor according to the present invention is configured, for example, in a manner such that a positive electrode with a positive electrode active material layer formed on a positive electrode current collector, a first separator, a negative electrode with a negative electrode active material layer formed on a negative electrode current collector and a second separator are wound or laminated in that order. At least one lithium ion supply source is disposed on a redundant portion of the first separator so as not to contact with the positive electrode. Then, the negative electrode current collector and the lithium ion supply source are short-circuited to constitute a lithium ion capacitor component. The lithium ion capacitor component is sealed in a square, cylindrical, or laminate-shaped outer container, and thereafter, an electrolytic solution is charged therein. It is thereby started to dope the lithium electrode, allowing the lithium ion to be doped into the negative electrode active material layer. The lithium ion capacitor is constructed in this manner.

Now, a description will be made to each of the components which constitute the lithium ion capacitor according to the present invention.

[Current Collector]

The positive electrode and the negative electrode include a positive electrode current collector and a negative electrode current collector for receiving and distributing electric charges, respectively. As the positive electrode current collector and the negative electrode current collector, for example, it is preferable to use expanded metal or a material having fine through holes formed to provide openings on the front and back surfaces by etching, such as by electrolytic etching, and dispose the lithium electrode to be opposite to at least one of the negative electrode and the positive electrode, thereby electrochemically supplying the lithium ion. The form and the number of the through holes are not limited to a particular one, but may be set so as to allow the lithium ions in the electrolytic solution to move across the front and back of the electrodes without being blocked by each of the electrode current collectors.

[Positive Electrode Current Collector]

The positive electrode current collector may be made of aluminum or stainless steel or the like. The thickness of the positive electrode current collector is not limited to a particular one, but may typically be 1 to 50 μm, preferably 5 to 40 μm, more preferably 10 to 40 μm.

Examples of a method of forming the through holes of the positive electrode current collector may include a method of forming openings by mechanical bombardment, etching and laser processing such as using the $CO_2$ laser, YAG laser, or UV laser. Each method may provide through holes in different shapes, and thus the conditions for processing may be optimized as appropriate so as to obtain the desired shape. The diameter of the through holes may be, for example, 0.001 to 1 mm, preferably 0.001 to 0.3 mm, more preferably 0.005 to 0.3 mm.

Furthermore, the opening ratio of the positive electrode current collector may be preferably 10 to 60%, more preferably 10 to 50%.

[Positive Electrode Active Material]

As the positive electrode active material, used is a substance which can be reversibly doped with or dedoped from at least one type of anion such as the lithium ion and tetrafluoroborate and which may include, for example, activated carbon powder. The specific surface of the activated carbon may be preferably 1000 to 2800 $m^2/g$, more preferably 1900 to 2600 $m^2/g$. On the other hand, from the viewpoints of the packing density of the activated carbon, the 50% volume cumulative diameter (D50) (average particle diameter) of the activated carbon may be preferably 2 to 8 μm, more preferably 3 to 8 μm. With the specific surface of the activated carbon and the D50 falling within the aforementioned ranges, the energy density of the lithium ion capacitor can be further improved. Note that the value of the 50% volume cumulative diameter (D50) in this embodiment is determined, for example, by the micro track method.

[(A) The Thickness of Positive Electrode: $T_A$]

It is preferable to hold that 390 μm≤$T_A$≤750 μm, where $T_A$ is the overall thickness of the positive electrode layer and the current collector, that is, the thickness of the positive electrode which is the total thicknesses of the current collector and the positive electrode layer, the positive electrode layer being made up of an electrically conductive layer and a positive electrode active material layer which are formed by adhering the positive electrode active material to the current collector by coating, printing, injection, spraying, vapor deposition, or being pressurized. With the thickness of the positive electrode falling within the aforementioned range, it is possible to provide a higher energy density while suppressing an increase in resistance.

[Negative Electrode Current Collector]

The negative electrode current collector may be made of stainless steel, copper, nickel or the like. The thickness of the negative electrode current collector is not limited to a particular one, but may be typically 1 to 50 μm, preferably 5 to 40 μm, more preferably 10 to 30 μm.

Examples of a method of forming the through holes of the negative electrode current collector may include a method of forming openings by mechanical bombardment, etching and laser processing such as using the $CO_2$ laser, YAG laser, or UV laser. Each method may provide through holes in different shapes, and thus the conditions for processing may be optimized as appropriate so as to obtain the desired shape. The diameter of the through holes may be, for example, 0.001 to 1 mm, preferably 0.001 to 0.3 mm, more preferably 0.005 to 0.3 mm.

Furthermore, the opening ratio of the negative electrode current collector may be preferably 10 to 60%, more preferably 10 to 50%.

[Negative Electrode Active Material]

As the negative electrode active material, used is a graphite-based material of substances which can be reversibly doped with or dedoped from the lithium ion. More specifically, artificial graphite, natural graphite and graphite-based composite particles may be included.

Here, the "graphite-based composite particle" is constructed such that the surface of a particle made of a crystalline material is coated with a noncrystalline material; more specifically, the surface of a particle made of a crystalline material such as graphite is coated with a noncrystalline material such as tar or pitch derived noncrystalline carbon.

The graphite-based composite particle is a carbon electrode substance that is obtained, for example, by a method of coating the surface of graphite with tar or pitch and then carbonizing the tar or pitch on the surface by heat treatment. In such a graphite-based composite particle, the presence or absence of the coating with the tar or pitch derived noncrystalline carbon on the surface of the graphite particle can be checked for through the measurement of the Raman spectrum, XRD or the like.

From the viewpoint of improvement in the output power, the grain size of the negative electrode active material may have a 50% volume cumulative diameter (D50) preferably falling within the range of 1.0 to 10 μm, more preferably a D50 falling within the range of 2 to 5 μm.

Note that the 50% volume cumulative diameter (D50) is, for example, a value that can be determined by the micro track method.

[(B) The Thickness of Negative Electrode: $T_B$]

It is preferable to hold that 100 μm≤$T_B$≤300 μm, where $T_B$ is the overall thickness of the negative electrode layer and the current collector, that is, the thickness of the negative electrode which is the total thickness of the current collector and the negative electrode layer, the negative electrode layer being made up of a negative electrode active material layer which is formed by adhering the negative electrode active material to the current collector by coating, printing, injection, spraying, vapor deposition, or being pressurized, the negative electrode layer being also made of an electrically conductive layer which is provided as required. With the value of the thickness $T_B$ of the negative electrode falling within the aforementioned range, it is possible to provide a higher energy density and improved durability.

[The Weight $W_A$ of Positive Electrode Layer and the Weight $W_B$ of Negative Electrode Layer]

For the lithium ion capacitor according to the present invention, the value of the ratio $W_A/W_B$ of the weight $W_A$ of the positive electrode layer to the weight $W_B$ of the negative electrode layer may preferably be within the range of 1.02≤$W_A/W_B$≤2.08. With the value of the ratio falling within this range, it is possible to more efficiently use the capacitance of the negative electrode and provide a further increased energy density.

[$\sqrt{(T_A^2 \times W_A/W_B)}$]

It is preferable that the square root value [$\sqrt{(T_A^2 \times W_A/W_B)}$] of the product of the square $T_A^2$ of the thickness $T_A$ of the positive electrode of the lithium ion capacitor according to the present invention and the ratio ($W_A/W_B$) of the weight $W_A$ of the positive electrode layer to the weight $W_B$ of the negative electrode layer falls within the range of 500≤$\sqrt{(T_A^2 \times W_A/W_B)}$≤1000. With the value falling within this range, it is possible to more efficiently use the capacitance of the negative electrode and provide a further increased energy density.

[Binder]

The positive electrode having the aforementioned positive electrode active material layer and the negative electrode having the aforementioned negative electrode active material layer can be made by a well-known method which is typically employed.

For example, each electrode (the positive electrode or the negative electrode) can be made by allowing each active material powder (the positive electrode active material or the negative electrode active material), a binder, and as required, an electrically conductive material and a thickener such as carboxymethyl cellulose (CMC) or the like to be added to and mixed with water or an organic solvent, so that the resulting slurry is coated on the current collector, or the slurry is formed in the shape of a sheet so as to be affixed to the current collector.

In making each of the aforementioned electrodes, it is possible to use, as a binder, for example, a rubber-based binder such as SBR, a fluorine-containing resin which is obtained by seed-polymerizing polytetrafluoroethylene, or polyvinylidene fluoride with an acryl-based resin, and an acryl-based resin.

Furthermore, examples of the electrically conductive material may include acetylene black, ketjen black, graphite, metal powder or the like.

The amount of each of the binder and the electrically conductive material to be added differs depending on the electrical conductivity of the active material being used or the shape of the electrode to be made. However, each may be typically preferably 2 to 40 mass % relative to the active material.

[Separator]

The separator of the lithium ion capacitor according to the present invention can be made of a material of which air permeability measured by a method in accordance with JISP8117 falls within the range of 1 to 500 sec. More specifically, one can choose as appropriate, for example, from among nonwoven fabric and fine porous film, which are formed of polyethylene, polypropylene, polyester, cellulose, polyolefin, or cellulose/rayon. Alternatively, the surface of the nonwoven fabric and fine porous film to be used may be coated with ceramic or the like to provide improved heat resistance. It is particularly preferable to use at least one selected from the group consisting of polypropylene, polyethylene and cellulose/rayon. The thickness of the separator may preferably be, for example, 1 to 100 μm, more preferably 5 to 50 μm.

[(C) Electrolytic Solution]

The lithium ion capacitor according to the present invention employs, as an electrolytic solution, an electrolyte solution of a lithium-salt aprotic organic solvent.

[Aprotic Organic Solvent of Electrolytic Solution]

Examples of the aprotic organic solvent constituting the electrolytic solution may include cyclic carbonates such as ethylene carbonate (EC), propylene carbonate (PC) and butylene carbonate, and chain carbonates such as dimethyl carbonate, methyl ethyl carbonate, diethyl carbonate (DEC) and methyl propyl carbonate. It is also acceptable to use a mixture solvent of two or more of these. In particular, it is preferable to use a mixture of a cyclic carbonate and a chain carbonate because an electrolytic solution can be obtained which is low in viscosity, high in dissociation degree, and high in ionic conductivity.

Specific examples of a mixture solvent may include a mixture solvent of EC/PC/DEC and a mixture solvent of EC/DEC. The ratio between the cyclic carbonate and the chain carbonate in such a mixture solvent is preferably 1:99 to 80:20 by weight, more preferably 10:90 to 60:40.

The organic solvent to be used as the electrolytic solution in the present invention may contain an organic solvent other than the cyclic carbonate and the chain carbonate, for example, cyclic esters such as γ-butyrolactone, cyclic sulfones such as sulfolane, cyclic ethers such as dioxolane, chain carboxylic acid esters such as ethyl propionate, or chain ethers such as dimethoxyethane.

[Electrolyte]

Examples of the lithium salt as an electrolyte in the electrolytic solution may include $LiClO_4$, $LiAsF_6$, $LiBF_4$, $LiPF_6$, $LiN(C_2F_3SO_2)_2$, $LiN(CF_3SO_2)_2$ or the like. In particular, $LiPF_6$ is preferredly employed because of its high ionic conductivity and low resistance. Since a low internal resistance can be obtained, the concentration of the lithium salt in the electrolytic solution is preferably 0.1 mol/L or greater, more preferably 0.5 to 1.5 mol/L.

[(D) The Weight $W_D$ of Lithium Ion Capacitor]

Each of the components mentioned above is used to constitute the lithium ion capacitor.

For the lithium ion capacitor according to the present invention, the value of the ratio $[(W_A+W_B)/W_D]$ of the sum of the weight $W_A$ of the positive electrode layer and the weight $W_B$ of the negative electrode layer to the weight $W_D$ of the lithium ion capacitor is preferably $0.19 \leq (W_A+W_B)/W_D \leq 0.28$. With the value of the ratio falling within this range, it is possible to provide an increased energy density.

For the lithium ion capacitor according to the present invention, the value of the ratio $[W_C/(W_A+W_B)]$ of the weight $W_C$ of the electrolytic solution to the sum of the weight $W_A$ of the positive electrode layer and the weight $W_B$ of the negative electrode layer is preferably $1.58 \leq W_C/(W_A+W_B) \leq 1.85$. With the value of the ratio falling within this range, it is possible to provide an increased energy density.

[Structure of Lithium Ion Capacitor]

While the embodiments of the present invention have been described above, the present invention is not limited to those embodiments, but may be modified in a variety of ways.

In particular, structural examples of the lithium ion capacitor according to the present invention may include a wound-type cell in which strip-shaped positive and negative electrodes are wound with a separator interposed therebetween, a laminated-type cell in which plate-shaped or sheet-shaped positive and negative electrodes are each stacked in three or more layers with a separator interposed therebetween and a laminated cell in which a unit with such a laminated structure is sealed in an outer film or a square outer can.

The structures of these capacitor cells are already known, for example, as disclosed in Japanese Patent Application Laid-Open No. 2004-266091, and can be configured in the same manner as those capacitor cells.

Furthermore, in the case where the lithium ion capacitor has an electrode unit (the laminated-type electrode unit or the wound-type electrode unit) in which the positive electrode and the negative electrode are laminated or wound with a separator interposed therebetween, the positive electrode constituting the electrode unit may include a plurality of positive electrode current collectors having holes penetrating across the front and back surfaces, the plurality of current collectors being configured to be laminated with positive electrode layers interposed therebetween. The lithium ion capacitor configured as such makes it possible to provide a further reduced resistance and longer service life.

Furthermore, the positive electrode having the plurality of positive electrode current collectors can be made, for example, by preparing a plurality of stacks in which the positive electrode layer made up of the positive electrode active material layer and the electrically conductive layer is formed on both the surfaces or one surface of the positive electrode current collector and by superimposing and thereby laminating the stacks.

Note that the thickness $T_A$ of the positive electrode having the plurality of positive electrode current collectors is the total thickness of the respective thicknesses of the plurality of positive electrode current collectors and the respective thicknesses of the positive electrode layers formed on the plurality of positive electrode current collectors.

For the lithium ion capacitor according to the present invention, the weight $W_A$ of the positive electrode layer made up of the positive electrode active material layer and the electrically conductive layer is, for example, 8 to 15 g. The weight $W_B$ of the negative electrode layer made up of the negative electrode active material layer and the electrically conductive layer is, for example, 3.5 to 12 g. The weight $W_C$ of the electrolytic solution is, for example, 15 to 45 g. The weight $W_D$ of the lithium ion capacitor is, for example, 50 to 100 g. However, these weights are different depending on various conditions and selected from those within an appropriate range.

EXAMPLES

Now, Examples of the present invention will be specifically described below. However, the present invention is not limited to these Examples.

Example 1

S1

(1) Preparing the Positive Electrode Sheet

Ten parts by weight of activated carbon particles having a 50% volume cumulative diameter (D50) value of 3 μm, 1.1 parts by weight of acetylene black powder and 20 parts by weight of isopropanol, which are all commercially available, were sufficiently mixed into a slurry. Then, 0.7 parts by weight of a binder made of polytetrafluoroethylene were added thereto to make a kneaded product, which was then molded into the shape of a sheet between reduction rollers so as to obtain a positive electrode sheet body with a thickness of 210 μm.

A chemically etched aluminum foil having through holes with a diameter of 0.3 mm, an opening ratio of 40% and a thickness of 30 μm was employed as the positive electrode current collector and coated on both the surfaces thereof with an electrically conductive paint for forming an electrically conductive layer. Immediately after that, the aforementioned positive electrode sheet bodies were affixed to both the surfaces of the positive electrode current collector. Then, the positive electrode current collector and the positive electrode sheet bodies were brought into intimate contact with each other between the reduction rollers, and after that, dried under vacuum so as to obtain a positive electrode material which had a positive electrode of a thickness $T_A$ of 461 μm (the total sum of the thicknesses of the positive electrode current collector and the electrically conductive layers on both the surfaces and the thickness of the positive electrode active material layers of the positive electrode sheet bodies on both the surfaces).

The positive electrode material, obtained in this manner, with the electrically conductive layer and the positive electrode active material layer laminated on part of the positive electrode current collector was cut into a size of 60 mm×80 mm so that the portion on which the electrically conductive layer and the positive electrode active material layer were laminated was 60 mm×65 mm (hereafter, this portion will also be referred to as the "coated portion" of the positive electrode sheet), and the portion on which no layer was formed was 60 mm×15 mm (hereafter, this portion will also be referred to as the "uncoated portion" of the positive electrode sheet). In this manner, the positive electrode sheet was prepared which had the positive electrode active material layers formed on each of both the surfaces of the positive electrode current collector with the electrically conductive layers interposed therebetween.

(2) Preparing the Negative Electrode Sheet

A slurry containing a negative electrode active material of graphite particles (obtained by crushing commercially available graphite) having a 50% volume cumulative diameter (D50) value of 2 μm and an SBR binder (manufactured by JSR: TRD 2001) were coated, using a vertical die double-sided coater, on both the surfaces of the negative electrode current collector of chemically etched copper foil having through holes with a diameter of 0.3 mm, an opening ratio of 43% and a thickness of 20 μm, under the conditions of a coating width of 85 mm and a coating speed of 8 m/min so that the thickness $T_B$ of the negative electrode (which is the total sum of the thicknesses of the negative electrode current collector and the negative electrode active material layers on both the surfaces) was 181 μm. After that, the electrode layers of the negative electrode active material layers were formed on both the surfaces of the negative electrode current collector by being dried under a reduced pressure at 200° C. for 24 hours.

The material, obtained in this manner, with the electrode layers formed on part of the negative electrode current collector was cut into a size of 65 mm×85 mm so that the portion on which the electrode layers were formed was 65 mm×70 mm (hereafter, this portion will also be referred to as the "coated portion" of the negative electrode sheet), and the portion on which the electrode layer was not formed was 65 mm×15 mm (hereafter, this portion will also be referred to as the "uncoated portion" of the negative electrode sheet). In this manner, the negative electrode sheet was prepared which had the electrode layers formed on both the surfaces of the negative electrode current collector.

(3) Preparing the Separator

A film of a cellulose/rayon composite material having a thickness of 20 μm and an air permeability of 120 sec was cut into a size of 67 mm×90 mm to prepare separators.

(4) Preparing the Lithium Ion Capacitor Component

First prepared were 7 positive electrode sheets, 8 negative electrode sheets and 16 separators. The separator, the negative electrode sheet, the separator and the positive electrode sheet were stacked on another in that order so that the positive electrode sheet and the negative electrode sheet were superimposed with the respective coated portions overlapped but with the respective uncoated portions opposite to each other and thus not overlapped. The stack was fixed along the four sides with tape, thereby preparing the electrode stack unit. The weight $W_A$ of the positive electrode layer was 8.51 g, and the weight $W_B$ of the negative electrode layer was 6.34 g.

Subsequently, a foil of lithium metal with a thickness of 195 μm was obtained by cutting, and then affixed under pressure to a chemically etched copper foil with a thickness of 20 μm, thereby forming a lithium ion supply member. After that, the lithium ion supply member was disposed on top of the electrode stack unit so as to be opposite to the negative electrode sheet.

Next, an aluminum positive electrode power supply tab with a seal portion formed with a sealant film heat-adhered in advance was superimposed on and welded to the uncoated portions of each of the seven positive electrode sheets of the prepared electrode stack unit, the power supply tab being 30 mm in width, 30 mm in length and 0.2 mm in thickness. On the other hand, a nickel-plated copper negative electrode power supply tab with a seal portion formed with a sealant film heat-adhered in advance was superimposed on and welded to the uncoated portions of each of the eight negative electrode sheets of the electrode stack unit and each lithium ion supply member, the power supply tab being 30 mm in width, 30 mm in length and 0.2 mm in thickness. In this manner, the lithium ion capacitor component was prepared.

(5) Preparing the Lithium Ion Capacitor

Prepared was one outer film which had a polypropylene layer, an aluminum layer and a nylon layer laminated, and a size of 90 mm in length, 117 mm in width and 0.15 mm in thickness, with the center portion being drawn to 70 mm in length and 97 mm in width. Also prepared was the other outer film which had a polypropylene layer, an aluminum layer and a nylon layer laminated, and a size of 90 mm in length, 117 mm in width and 0.15 mm in thickness.

Subsequently, the lithium ion capacitor component was disposed on the center portion of the other outer film so that each of the positive electrode power supply tab and the negative electrode power supply tab were protruded outwardly from an end and the other end of the other outer film, respectively. The one outer film was superimposed on the lithium ion capacitor component, so that three sides including the two sides of the outer periphery of the one outer film and the other outer film from which the positive electrode power supply tab and the negative electrode power supply tab were protruded were heat sealed.

On the other hand, using a solvent mixture obtained by mixing ethylene carbonate, propylene carbonate and diethyl carbonate at a ratio of 3:1:4 by volume, prepared was an electrolytic solution which contained $LiPF_6$ of a concentration of 1.2 mol/L and as an additive, lithium bis(oxalate) borate expressed by a following formula (1) at a ratio of 0.2 weight % per the total weight of the electrolytic solution.

Then, after 25.5 g of the aforementioned electrolytic solution was injected in between the one outer film and the other outer film, the remaining one side of the outer periphery of the one outer film and the other outer film was heat sealed.

In this manner, the laminate casing lithium ion capacitor cell (hereafter also referred to simply as the "cell") S1 for test was prepared. The weight $W_D$ of the cell S1 was 66.8 g.

[Chemical Formula 1]

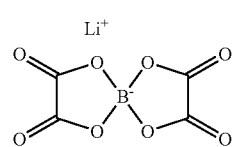

Formula (1)

In the foregoing, the requirements for the configuration of the cell S1 of the present invention have been described. Now, referring to the cell S1, the requirements for the configuration of cells S2 to S13 of the present invention and cells C1 to C11 to be shown for comparison purposes will be described below.

Example 2

S2

The thickness $T_B$ of the negative electrode which had, on each of both the surfaces, the electrode layer of a negative electrode active material layer was set to 226 μm, and the electrode layers of the negative electrode active material layers were formed on both the surfaces of the negative electrode current collector. Then, the electrolytic solution ($W_C$ 27.7 g) which had the same composition ratio as that of Example 1 was charged so as to prepare a cell S2 ($W_D$ 70.9 g) in the same configuration as that of Example 1 except that lithium metal with a thickness of 250 μm was employed. The weight $W_A$ of the positive electrode layer was 8.51 g, and the weight $W_B$ of the negative electrode layer was 8.02 g.

Example 3

S3

The thickness $T_B$ of the negative electrode which had, on each of both the surfaces, the electrode layer of a negative electrode active material layer was set to 122 μm, and the electrode layers of the negative electrode active material layers were formed on both the surfaces of the negative electrode current collector. Then, the electrolytic solution ($W_C$ 22.6 g) which had the same composition ratio as that of Example 1 was charged so as to prepare a cell S3 ($W_D$ 61.5 g) in the same configuration as that of Example 1 except that lithium metal with a thickness of 120 μm was employed. The weight $W_A$ of the positive electrode layer was 8.51 g, and the weight $W_B$ of the negative electrode layer was 4.15 g.

Example 4

S4

The thickness $T_A$ of the positive electrode which had, on each of both the surfaces, the electrode layer composed of an electrically conductive layer and a positive electrode active material layer was set to 390 μm, and the electrode layers of the electrically conductive layers and the positive electrode active material layers were formed on both the surfaces of the positive electrode current collector.

The thickness $T_B$ of the negative electrode which had, on each of both the surfaces, the electrode layer of the negative electrode active material layer was set to 156 μm, and the electrode layers of the negative electrode active material layers were formed on both the surfaces of the negative electrode current collector. Then, the electrolytic solution ($W_C$ 22.3 g) which had the same composition ratio as that of Example 1 was charged so as to prepare a cell S4 ($W_D$ 61.4 g) in the same configuration as that of Example 1 except that lithium metal with a thickness of 165 μm was employed. The weight $W_A$ of the positive electrode layer was 7.34 g, and the weight $W_B$ of the negative electrode layer was 5.42 g.

Example 5

S5

The thickness $T_B$ of the negative electrode which had, on each of both the surfaces, the electrode layer of a negative electrode active material layer was set to 106 μm, and the electrode layers of the negative electrode active material layers were formed on both the surfaces of the negative electrode current collector. Then, the electrolytic solution ($W_C$ 19.8 g) which had the same composition ratio as that of Example 1 was charged so as to prepare a cell S5 ($W_D$ 56.9 g) in the same configuration as that of Example 4 except that lithium metal with a thickness of 105 μm was employed. The weight $W_A$ of the positive electrode layer was 7.34 g, and the weight $W_B$ of the negative electrode layer was 3.55 g.

Example 6

S6

The thickness $T_A$ of the positive electrode which had, on each of both the surfaces, the electrode layer composed of an electrically conductive layer and a positive electrode active material layer was set to 747 μm, and the electrode layers of the electrically conductive layers and the positive electrode active material layers were formed on both the surfaces of the positive electrode current collector.

The thickness $T_B$ of the negative electrode which had, on each of both the surfaces, the electrode layer of a negative electrode active material layer was set to 273 μm, and the electrode layers of the negative electrode active material layers were formed on both the surfaces of the negative electrode current collector. Then, the electrolytic solution ($W_C$ 37.4 g) which had the same composition ratio as that of Example 1 was charged so as to prepare a cell S6 ($W_D$ 86.8 g) in the same configuration as that of Example 1 except that lithium metal with a thickness of 300 μm was employed. The weight $W_A$ of the positive electrode layer was 12.85 g, and the weight $W_B$ of the negative electrode layer was 9.78 g.

Example 7

S7

A cell S7 ($W_D$ 67.5 g) was prepared in the same configuration as that of Example 3 except that the electrolytic solution ($W_C$ 28.6 g) was charged which had the same composition ratio as that of Example 1.

Example 8

S8

A cell S8 ($W_D$ 57.5 g) was prepared in the same configuration as that of Example 3 except that the electrolytic solution ($W_C$ 18.6 g) was charged which had the same composition ratio as that of Example 1.

Example 9

S9

A cell S9 ($W_D$ 91.8 g) was prepared in the same configuration as that of Example 6 except that the electrolytic solution ($W_C$ 42.4 g) was charged which had the same composition ratio as that of Example 1.

Example 10

S10

The thickness $T_B$ of the negative electrode which had, on each of both the surfaces, the electrode layer of a negative electrode active material layer was set to 342 μm, and the electrode layers of the negative electrode active material layers were formed on both the surfaces of the negative electrode current collector. Then, the electrolytic solution ($W_C$ 40.9 g) which had the same composition ratio as that of Example 1 was charged so as to prepare a cell S10 ($W_D$ 93.1 g) in the same configuration as that of Example 6 except that lithium metal with a thickness of 390 μm was employed. The weight $W_A$ of the positive electrode layer was 12.85 g, and the weight $W_B$ of the negative electrode layer was 12.37 g.

Example 11

S11

Two positive electrode sheets, each having, on each of both the surfaces, the electrode layer composed of an electrically conductive layer and a positive electrode active material layer were laminated, and the uncoated portions of the two positive electrode sheets were superimposed and electrically connected to each other so as to provide one positive electrode. The electrode layer composed of the electrically conductive layer and the positive electrode active material layer was formed on each of both the surfaces of the positive electrode current collector so that the thickness of the positive electrode (the total thickness of the two positive electrode sheets) $T_A$ was 461 μm. Then, prepared were 14 positive electrode sheets (7 sets of two positive electrode sheets for forming one positive electrode), 8 negative electrode sheets and 16 separators. An electrode stack unit was prepared in the same manner as Example 1 except that the separator, the negative electrode sheet, the separator, and one set of two positive electrode sheets (more specifically, the positive electrode sheet and the positive electrode sheet) for forming one positive electrode were stacked on another in that order so that the positive electrode sheet and the negative electrode sheet were superimposed with the respective coated portions overlapped but with the respective uncoated portions opposite to each other and thus not overlapped. Here, in the resulting electrode stack unit, each of the positive electrodes constituting the electrode stack unit was formed of two positive electrode sheets, so that a plurality of (more specifically two) positive electrode current collectors were laminated with the electrode layer composed of the electrically conductive layer and the positive electrode active material layer interposed therebetween. Then, the electrolytic solution ($W_C$ 24.8 g) which had the same composition ratio as that of Example 1 was charged so as to prepare a cell S11 ($W_D$ 65.7 g) in the same configuration as that of Example 1 except that the resulting electrode stack unit was employed. The weight $W_A$ of the positive electrode layer was 8.12 g, and the weight $W_B$ of the negative electrode layer was 6.34 g.

Example 12

S12

Two positive electrode sheets, each having, on each of both the surfaces, the electrode layer composed of an electrically conductive layer and a positive electrode active material layer were laminated, and the uncoated portions of the two positive electrode sheets were superimposed and electrically connected to each other so as to provide one positive electrode. The electrode layer composed of the electrically conductive layer and the positive electrode active material layer was formed on each of both the surfaces of the positive electrode current collector so that the thickness of the positive electrode (the total thickness of the two positive electrode sheets) $T_A$ was 747 μm. Furthermore, the thickness $T_B$ of the negative electrode which had, on each of both the surfaces, the electrode layer of a negative electrode active material layer was set to 273 μm in the same manner as the negative electrode sheet employed in Example 6. The electrode stack unit was prepared in the same manner as Example 11 except that the electrode layer of the negative electrode active material layer was formed on each of both the surfaces of the negative electrode current collector. Here, in the resulting electrode stack unit, each of the positive electrodes constituting the electrode stack unit was formed of two positive electrode sheets, so that a plurality of (more specifically two) positive electrode current collectors were laminated with the electrode layer composed of the electrically conductive layer and the positive electrode active material layer interposed therebetween. Then, the electrolytic solution ($W_C$ 38.5 g) which had the same composition ratio as that of Example 1 was charged so as to prepare a cell S12 ($W_D$ 88.5 g) in the same configuration as that of Example 11. The weight $W_A$ of the positive electrode layer was 13.48 g, and the weight $W_B$ of the negative electrode layer was 9.78 g.

Example 13

S13

Three positive electrode sheets, each having, on each of both the surfaces, the electrode layer composed of an electrically conductive layer and a positive electrode active material layer were laminated, and the uncoated portions of the three positive electrode sheets were superimposed and electrically connected to each other so as to provide one positive electrode. The electrode layer composed of the electrically conductive layer and the positive electrode active material layer was formed on each of both the surfaces of the positive electrode current collector so that the thickness of the positive electrode (the total thickness of the three positive electrode sheets) $T_A$ was 747 μm. Then, prepared were 21 positive electrode sheets (7 sets of three positive electrode sheets for forming one positive electrode), 8 negative electrode sheets and 16 separators. An electrode stack unit was prepared in the same manner as in Example 12 except that the separator, the negative electrode sheet, the separator, one set of three positive electrode sheets for forming one positive electrode (more specifically, the positive electrode sheet, the positive electrode sheet and the positive electrode sheet) were stacked on another in that order so that the positive electrode sheet and the negative electrode sheet were superimposed with the respective coated portions overlapped but with the respective uncoated portions opposite to each other and thus not overlapped. Here, in the resulting electrode stack unit, each of the positive electrodes constituting the electrode stack unit was formed of the three positive electrode sheets, so that a plurality of (more specifically three) positive electrode current collectors were laminated with the electrode layer composed of the electrically conductive layer and the positive electrode active material layer interposed therebetween. Then, the electrolytic solution ($W_C$ 37.5 g) which had the same composition ratio as that of Example 1 was charged so as to prepare a cell S13 ($W_D$ 86.9 g) in the same configuration as that of Example 1 except that the resulting electrode stack unit was employed. The weight $W_A$ of the positive electrode layer was 12.87 g, and the weight $W_B$ of the negative electrode layer was 9.78 g.

Comparative Example 1

C1

The thickness $T_B$ of the negative electrode which had, on each of both the surfaces, the electrode layer of a negative electrode active material layer was set to 257 μm, and the electrode layers of a negative electrode active material layers were formed on both the surfaces of a negative electrode current collector. Then, the electrolytic solution ($W_C$ 29.3 g) which had the same composition ratio as that of Example 1 was charged so as to prepare a cell C1 ($W_D$ 73.7 g) in the same configuration as that of Example 1 except that lithium metal with a thickness of 290 μm was employed. The weight $W_A$ of the positive electrode layer was 8.51 g, and the weight $W_B$ of the negative electrode layer was 9.19 g.

Comparative Example 2

C2

The thickness $T_B$ of the negative electrode which had, on each of both the surfaces, the electrode layer of a negative electrode active material layer was set to 116 μm, and the electrode layers of the negative electrode active material layers were formed on both the surfaces of the negative electrode current collector. Then, the electrolytic solution ($W_C$ 22.2 g) which had the same composition ratio as that of Example 1 was charged so as to prepare a cell C2 ($W_D$ 60.9 g) in the same configuration as that of Example 1 except that lithium metal with a thickness of 110 μm was employed. The weight $W_A$ of the positive electrode layer was 8.51 g, and the weight $W_B$ of the negative electrode layer was 3.89 g.

Comparative Example 3

C3

The thickness $T_A$ of the positive electrode which had, on each of both the surfaces, the electrode layer composed of an electrically conductive layer and a positive electrode active material layer was set to 385 μm, and the electrode layers of the electrically conductive layers and the positive electrode active material layers were formed on both the surfaces of the positive electrode current collector.
The thickness $T_B$ of the negative electrode which had, on each of both the surfaces, the electrode layer of a negative electrode active material layer was set to 154 μm, and the electrode layers of the negative electrode active material layers were formed on both the surfaces of the negative electrode current collector. Then, the electrolytic solution ($W_C$ 22.0 g) which had the same composition ratio as that of Example 1 was charged so as to prepare a cell C3 ($W_D$ 61.0 g) in the same configuration as that of Example 1 except that lithium metal with a thickness of 165 μm was employed. The weight $W_A$ of the positive electrode layer was 7.26 g, and the weight $W_B$ of the negative electrode layer was 5.35 g.

Comparative Example 4

C4

The thickness $T_B$ of the negative electrode which had, on each of both the surfaces, the electrode layer of a negative electrode active material layer was set to 219 μm, and the electrode layers of the negative electrode active material layers were formed on both the surfaces of the negative electrode current collector. Then, the electrolytic solution ($W_C$ 25.2 g) which had the same composition ratio as that of Example 1 was charged so as to prepare a cell C4 ($W_D$ 66.8 g) in the same configuration as that of Comparative Example 3 except that lithium metal with a thickness of 245 μm was employed. The weight $W_A$ of the positive electrode layer was 7.26 g, and the weight $W_B$ of the negative electrode layer was 7.75 g.

Comparative Example 5

C5

The thickness $T_B$ of the negative electrode which had, on each of both the surfaces, the electrode layer of a negative electrode active material layer was set to 99 μm, and the electrode layers of the negative electrode active material layers were formed on both the surfaces of the negative electrode current collector. Then, the electrolytic solution ($W_C$ 19.3 g) which had the same composition ratio as that of Example 1 was charged so as to prepare a cell C5 ($W_D$ 56.0 g) in the same configuration as that of Comparative Example 3 except that lithium metal with a thickness of 95 μm was employed. The weight $W_A$ of the positive electrode layer was 7.26 g, and the weight $W_B$ of the negative electrode layer was 3.28 g.

Comparative Example 6

C6

The thickness $T_A$ of the positive electrode which had, on each of both the surfaces, the electrode layer composed of an electrically conductive layer and a positive electrode active material layer was set to 838 μm, and the electrode layers of the electrically conductive layers and the positive electrode active material layers were formed on both the surfaces of the positive electrode current collector.
The thickness $T_B$ of the negative electrode which had, on each of both the surfaces, the electrode layer of a negative electrode active material layer was set to 300 μm, and the electrode layers of the negative electrode active material layers were formed on both the surfaces of the negative electrode current collector. Then, the electrolytic solution ($W_C$ 40.9 g) which had the same composition ratio as that of Example 1 was charged so as to prepare a cell C6 ($W_D$ 92.7 g) in the same configuration as that of Example 1 except that lithium metal with a thickness of 335 μm was employed. The weight $W_A$ of the positive electrode layer was 14.13 g, and the weight $W_B$ of the negative electrode layer was 10.79 g.

Comparative Example 7

C7

The thickness $T_B$ of the negative electrode which had, on each of both the surfaces, the electrode layer of a negative electrode active material layer was set to 429 μm, and the electrode layers of the negative electrode active material layers were formed on both the surfaces of the negative electrode current collector. Then, the electrolytic solution ($W_C$ 47.4 g) which had the same composition ratio as that of Example 1 was charged so as to prepare a cell C7 ($W_D$ 104.4 g) in the same configuration as that of Comparative Example 6 except that lithium metal with a thickness of 500 μm was employed. The weight $W_A$ of the positive electrode layer was 14.13 g, and the weight $W_B$ of the negative electrode layer was 15.63 g.

Comparative Example 8

C8

The thickness $T_B$ of the negative electrode which had, on each of both the surfaces, the electrode layer of a negative electrode active material layer was set to 189 μm, and the electrode layers of the negative electrode active material layers were formed on both the surfaces of the negative electrode current collector. Then, the electrolytic solution ($W_C$ 35.4 g) which had the same composition ratio as that of Example 1 was charged so as to prepare a cell C8 ($W_D$ 82.6 g) in the same configuration as that of Comparative Example 6 except that lithium metal with a thickness of 190 μm was employed. The weight $W_A$ of the positive electrode layer was 14.13 g, and the weight $W_B$ of the negative electrode layer was 6.63 g.

Comparative Example 9

C9

Two positive electrode sheets, each having, on each of both the surfaces, the electrode layer composed of an electrically conductive layer and a positive electrode active material layer were laminated, and the uncoated portions of the two positive electrode sheets were superimposed and electrically connected to each other so as to provide one positive electrode. The electrode layer composed of the electrically conductive layer and the positive electrode active material layer was formed on each of both the surfaces of the positive electrode current collector so that the thickness of the positive electrode (the total thickness of the two positive electrode sheets) $T_A$ was 385 μm. Furthermore, the thickness $T_B$ of the negative electrode which had, on each of both the surfaces, the electrode layer of a negative electrode active material layer was set to 154 μm in the same manner as the negative electrode sheet used in Comparative Example 3. An electrode stack unit was prepared in the same manner as in Example 11 except that the electrode layer of the negative electrode active material layer was formed on each of both the surfaces of the negative electrode current collector. Here, in the resulting electrode stack unit, each of the positive electrodes constituting the electrode stack unit was formed of two positive electrode sheets, so that a plurality of (more specifically two) positive electrode current collectors were laminated with the electrode layer composed of the electrically conductive layer and the positive electrode active material layer interposed therebetween. Then, the electrolytic solution ($W_C$ 21.0 g) which had the same composition ratio as that of Example 1 was charged so as to prepare a cell C9 ($W_D$ 59.4 g) in the same configuration as that of Example 11. The weight $W_A$ of the positive electrode layer was 6.67 g, and the weight of $W_B$ of the negative electrode layer was 5.35 g.

Comparative Example 10

C10

Two positive electrode sheets, each having, on each of both the surfaces, the electrode layer composed of an electrically conductive layer and a positive electrode active material layer were laminated, and the uncoated portions of the two positive electrode sheets were superimposed and electrically connected to each other so as to provide one positive electrode. The electrode layer composed of the electrically conductive layer and the positive electrode active material layer was formed on each of both the surfaces of the positive electrode current collector so that the thickness of the positive electrode (the total thickness of the two positive electrode sheets) $T_A$ was 838 μm. Furthermore, the thickness $T_B$ of the negative electrode which had, on each of both the surfaces, the electrode layer of the negative electrode active material layer was set to 189 μm in the same manner as the negative electrode sheet used in Comparative Example 8. An electrode stack unit was prepared in the same manner as in Example 11 except that the electrode layers of the negative electrode active material layers were formed on both the surfaces of the negative electrode current collector. Here, in the resulting electrode stack unit, each of the positive electrodes constituting the electrode stack unit was formed of two positive electrode sheets, so that a plurality of (more specifically two) positive electrode current collectors were laminated with the electrode layer composed of the electrically conductive layer and the positive electrode active material layer interposed therebetween. Then, the electrolytic solution ($W_C$ 37.3 g) which had the same composition ratio as that of Example 1 was charged so as to prepare a cell C10 ($W_D$ 85.6 g) in the same configuration as that of Example 11. The weight $W_A$ of the positive electrode layer was 15.24 g, and the weight $W_B$ of the negative electrode layer was 6.63 g.

Comparative Example 11

C11

Three positive electrode sheets, each having, on each of both the surfaces, the electrode layer composed of an electrically conductive layer and a positive electrode active material layer were laminated, and the uncoated portions of the three positive electrode sheets were superimposed and electrically connected to each other so as to provide one positive electrode. The electrode layer composed of the electrically conductive layer and the positive electrode active material layer was formed on each of both the surfaces of the positive electrode current collector so that the thickness of the positive electrode (the total thickness of the three positive electrode sheets) $T_A$ was 838 μm. Furthermore, the thickness $T_B$ of the negative electrode which had, on each of both the surfaces, the electrode layer of a negative electrode active material layer was set to 189 μm in the same manner as the negative electrode sheet used in Comparative Example 10. An electrode stack unit was prepared in the same manner as in Example 13 except that the electrode layer of the negative electrode active material layer was formed on each of both the surfaces of the negative electrode current collector. Here, in the resulting electrode stack unit, each of the positive electrodes constituting the electrode stack unit was formed of the three positive electrode sheets, so that a plurality of (more specifically three) positive electrode current collectors were laminated with the electrode layer composed of the electrically conductive layer and the positive electrode active material layer interposed therebetween. Then, the electrolytic solution ($W_C$ 36.2 g) which had the same composition ratio as that of Example 1 was charged so as to prepare a cell C11 ($W_D$ 83.9 g) in the same configuration as that of Example 13. The weight $W_A$ of the positive electrode layer was 14.60 g, and the weight $W_B$ of the negative electrode layer was 6.63 g.

[Evaluation of the Test-Use Laminate-Casing Lithium Ion Capacitor Cell]

The items below were evaluated for each of the aforementioned cells S1 to S13 of the present invention and the comparative cells C1 to C11. The results are shown in Table 1.

(a) Weight Energy Density

The test-use laminate-casing lithium ion capacitor cell was charged with a constant current of 1CA until a voltage of 3.8V across the capacitor was reached. Subsequently, charging by applying a constant voltage of 3.8 V to the cell was carried out for 0.5 hours at a constant current and constant voltage. Then, as a result of discharging at a constant current of 1CA until a voltage of 2.2 V across the capacitor was reached, the weight energy density (Wh/kg) was determined from the amount of energy that had been found.

(b) Capacity Retention

The aforementioned charging and discharging were repeated 5000 cycles to determine the capacity retention (%).

[Alternating-Current Internal Resistance]

(c) Product R·C of Alternating-Current Internal Resistance and Capacitance

The alternating-current internal resistance $R(\Omega)$ of the test-use laminate-casing lithium ion capacitor cell was measured at 1 KHz under an environment of 25° C.±5° C., and the product R·C $(\Omega \cdot F)$ of the resulting resistance and the capacitance C of the cell was determined.

Tester: High AC milli-ohm tester 3560 manufactured by HIOKI E. E. Corp.

Measurement temperature: 25° C.

The aforementioned evaluation items (a) to (c) were evaluated on the basis of the standards below. Furthermore, the overall determination was made to be "No Good" when Evaluation "A" was found for any one of the evaluation items (a) to (c), and otherwise, that is, when Evaluation "A" was not found, the overall determination was made to be "Good".

(a) Weight Energy Density
"A": Less than 17 (Wh/kg), and thus No Good.
"B": 17 (Wh/kg) or greater and less than 18 (Wh/kg), and thus Good.
"C": 18 (Wh/kg) or greater, and thus Very good.

(b) Capacity Retention
"A": Less than 93(%), and thus No Good.
"B": 93(%) or greater and less than 95(%), and thus Good.
"C": 95(%) or greater, and thus Very good.

(c) Alternating-Current Internal Resistance (R·C)
"A": greater than 10 $(\Omega \cdot F)$, and thus No Good.
"B": 10 $(\Omega \cdot F)$ or less, and thus Good.

TABLE 1

| | | POSITIVE ELECTRODE | | | NEGATIVE ELECTRODE | | | ELECTROLYTIC |
|---|---|---|---|---|---|---|---|---|
| | CELL | NUMBER OF CURRENT COLLECTORS | THICKNESS $T_A$ (μm) | WEIGHT OF ELECTRODE LAYER $W_A$ (g) | NUMBER OF CURRENT COLLECTORS | THICKNESS $T_B$ (μm) | WEIGHT OF ELECTRODE LAYER $W_B$ (g) | SOLUTION WEIGHT $W_C$ (g) |
| EXAMPLE 1 | S1 | 1 | 461 | 8.51 | 1 | 181 | 6.34 | 25.5 |
| EXAMPLE 2 | S2 | 1 | 461 | 8.51 | 1 | 226 | 8.02 | 27.7 |
| EXAMPLE 3 | S3 | 1 | 461 | 8.51 | 1 | 122 | 4.15 | 22.6 |
| EXAMPLE 4 | S4 | 1 | 390 | 7.34 | 1 | 156 | 5.42 | 22.3 |
| EXAMPLE 5 | S5 | 1 | 390 | 7.34 | 1 | 106 | 3.55 | 19.8 |
| EXAMPLE 6 | S6 | 1 | 747 | 12.85 | 1 | 273 | 9.78 | 37.4 |
| EXAMPLE 7 | S7 | 1 | 461 | 8.51 | 1 | 122 | 4.15 | 28.6 |
| EXAMPLE 8 | S8 | 1 | 461 | 8.51 | 1 | 122 | 4.15 | 18.6 |
| EXAMPLE 9 | S9 | 1 | 747 | 12.85 | 1 | 273 | 9.78 | 42.4 |
| EXAMPLE 10 | S10 | 1 | 747 | 12.85 | 1 | 342 | 12.37 | 40.9 |
| EXAMPLE 11 | S11 | 2 | 461 | 8.12 | 1 | 181 | 6.34 | 24.8 |
| EXAMPLE 12 | S12 | 2 | 747 | 13.48 | 1 | 273 | 9.78 | 38.5 |
| EXAMPLE 13 | S13 | 3 | 747 | 12.87 | 1 | 273 | 9.78 | 37.5 |
| COMPARATIVE EXAMPLE 1 | C1 | 1 | 461 | 8.51 | 1 | 257 | 9.19 | 29.3 |
| COMPARATIVE EXAMPLE 2 | C2 | 1 | 461 | 8.51 | 1 | 116 | 3.89 | 22.2 |
| COMPARATIVE EXAMPLE 3 | C3 | 1 | 385 | 7.26 | 1 | 154 | 5.35 | 22.0 |
| COMPARATIVE EXAMPLE 4 | C4 | 1 | 385 | 7.26 | 1 | 219 | 7.75 | 25.2 |
| COMPARATIVE EXAMPLE 5 | C5 | 1 | 385 | 7.26 | 1 | 99 | 3.28 | 19.3 |
| COMPARATIVE EXAMPLE 6 | C6 | 1 | 838 | 14.13 | 1 | 300 | 10.79 | 40.9 |
| COMPARATIVE EXAMPLE 7 | C7 | 1 | 838 | 14.13 | 1 | 429 | 15.63 | 47.4 |
| COMPARATIVE EXAMPLE 8 | C8 | 1 | 838 | 14.13 | 1 | 189 | 6.63 | 35.4 |
| COMPARATIVE EXAMPLE 9 | C9 | 2 | 385 | 6.67 | 1 | 154 | 5.35 | 21.0 |
| COMPARATIVE EXAMPLE 10 | C10 | 2 | 838 | 15.24 | 1 | 189 | 6.63 | 37.3 |
| COMPARATIVE EXAMPLE 11 | C11 | 3 | 838 | 14.60 | 1 | 189 | 6.63 | 36.2 |

| | CELL WEIGHT $W_D$ (g) | $(W_A + W_B)/W_D$ | $W_A/W_B$ | $W_C/(W_A + W_B)$ | $\sqrt{(T_A^2 \times W_A/W_B)}$ | WEIGHT ENERGY DENSITY (Wh/Kg) | | R·C $(\Omega \cdot F)$ | | CAPACITY RETENTION | OVERALL DETERMINATION |
|---|---|---|---|---|---|---|---|---|---|---|---|
| EXAMPLE 1 | 66.8 | 0.222 | 1.342 | 1.717 | 534 | 18.4 | C | 6.42 | B | C | GOOD |
| EXAMPLE 2 | 70.9 | 0.233 | 1.061 | 1.676 | 475 | 17.5 | B | 6.46 | B | C | GOOD |
| EXAMPLE 3 | 61.5 | 0.206 | 2.051 | 1.785 | 660 | 19.6 | C | 6.29 | B | C | GOOD |
| EXAMPLE 4 | 61.4 | 0.208 | 1.354 | 1.748 | 454 | 17.1 | B | 5.48 | B | C | GOOD |
| EXAMPLE 5 | 56.9 | 0.191 | 2.068 | 1.818 | 561 | 18.1 | C | 5.38 | B | C | GOOD |

TABLE 1-continued

| | | | | | | | | | | | |
|---|---|---|---|---|---|---|---|---|---|---|---|
| EXAMPLE 6 | 86.8 | 0.261 | 1.314 | 1.653 | 856 | 21.8 | C | 9.89 | B | C | GOOD |
| EXAMPLE 7 | 67.5 | 0.188 | 2.051 | 2.259 | 660 | 17.8 | B | 5.96 | B | C | GOOD |
| EXAMPLE 8 | 57.5 | 0.220 | 2.051 | 1.469 | 660 | 20.9 | C | 7.57 | B | B | GOOD |
| EXAMPLE 9 | 91.8 | 0.247 | 1.314 | 1.874 | 856 | 20.6 | C | 9.36 | B | C | GOOD |
| EXAMPLE 10 | 93.1 | 0.271 | 1.039 | 1.622 | 761 | 20.5 | C | 9.97 | B | B | GOOD |
| EXAMPLE 11 | 65.7 | 0.220 | 1.281 | 1.715 | 522 | 17.4 | B | 5.64 | B | C | GOOD |
| EXAMPLE 12 | 88.5 | 0.263 | 1.379 | 1.655 | 877 | 20.4 | C | 8.93 | B | C | GOOD |
| EXAMPLE 13 | 86.9 | 0.261 | 1.316 | 1.654 | 857 | 19.8 | C | 8.51 | B | C | GOOD |
| COMPARATIVE EXAMPLE 1 | 73.7 | 0.240 | 0.926 | 1.655 | 444 | 16.8 | A | 6.49 | B | C | NO GOOD |
| COMPARATIVE EXAMPLE 2 | 60.9 | 0.204 | 2.188 | 1.790 | 682 | 19.7 | C | 6.27 | B | A | NO GOOD |
| COMPARATIVE EXAMPLE 3 | 61.0 | 0.207 | 1.357 | 1.745 | 448 | 16.9 | A | 5.41 | B | C | NO GOOD |
| COMPARATIVE EXAMPLE 4 | 66.8 | 0.225 | 0.937 | 1.679 | 373 | 15.7 | A | 5.47 | B | C | NO GOOD |
| COMPARATIVE EXAMPLE 5 | 56.0 | 0.188 | 2.213 | 1.831 | 573 | 18.1 | C | 5.29 | B | A | NO GOOD |
| COMPARATIVE EXAMPLE 6 | 92.7 | 0.269 | 1.310 | 1.641 | 959 | 22.5 | C | 10.92 | A | C | NO GOOD |
| COMPARATIVE EXAMPLE 7 | 104.4 | 0.285 | 0.904 | 1.593 | 797 | 20.2 | C | 11.04 | A | A | NO GOOD |
| COMPARATIVE EXAMPLE 8 | 82.6 | 0.251 | 2.131 | 1.705 | 1223 | 24.7 | C | 10.67 | A | A | NO GOOD |
| COMPARATIVE EXAMPLE 9 | 59.4 | 0.202 | 1.247 | 1.749 | 430 | 16.0 | A | 4.69 | B | C | NO GOOD |
| COMPARATIVE EXAMPLE 10 | 85.6 | 0.255 | 2.299 | 1.705 | 1271 | 22.9 | C | 9.69 | B | A | NO GOOD |
| COMPARATIVE EXAMPLE 11 | 83.9 | 0.253 | 2.202 | 1.705 | 1244 | 22.4 | C | 9.28 | B | A | NO GOOD |

The cells S1 to S13 according to Examples of the present invention satisfy that $1.02 \leq (W_A/W_B) \leq 2.08$ and that $390 \text{ μm} \leq T_A \leq 750 \text{ μm}$, and thus have a high energy density, a low resistance, and a long service life. In particular, it is clear that the cells S1 and S5 satisfy that $500 \leq \sqrt{(T_A^2 \times W_A/W_B)} \leq 1000$, and thus have a high energy density.

Furthermore, the cells S11 to S13 according to Examples are configured such that the positive electrode has a plurality of positive electrode current collectors, and it is thus clear that the cells have a low resistance and a long service life.

The cell C1 of Comparative Example is configured such that $1.02 > (W_A/W_B)$, and thus has a lower energy density than the cells S1, S2 and S3 of Examples. The cell C2 of Comparative Example is configured such that $(W_A/W_B) > 2.08$, and thus has a lower cycle property than the cells S1, S2 and S3 of Examples.

Furthermore, the cells C3 and C4 of Comparative Examples are configured such that $390 \text{ μm} > T_A$, and thus have a lower energy density than the cells S4 and S5 of Examples. The cell C5 of Comparative Example is configured such that $390 \text{ μm} > T_A$ and satisfies that $500 \leq \sqrt{(T_A^2 \times W_A/W_B)} \leq 1000$, and thus has a similar energy density to those of the cells S4 and S5 of Examples, but is configured such that $(W_A/W_B) > 2.08$, and thus has a lower cycle property. The cells C6, C7 and C8 of Comparative Examples are configured such that $T_A > 750 \text{ μm}$, and thus have a high energy density, but a higher resistance than the cell S6 of Example.

Furthermore, each of the C9 to C11 of Comparative Examples is configured such that the positive electrode has a plurality of positive electrode current collectors and thus has a low resistance, but does not satisfy that $1.02 \leq W_A/W_B \leq 2.08$ and/or that $390 \text{ μm} \leq T_A \leq 750 \text{ μm}$, and thus does not satisfy a high energy density and long service life at the same time.

The invention claimed is:

1. An accumulator device (D), comprising:
a positive electrode in which a positive electrode layer (A) is formed;
a negative electrode in which a negative electrode layer (B) is formed; and
an electrolytic solution (C);
wherein:
the accumulator device (D) satisfies:

$$1.02 \leq W_A/W_B \leq 2.08;$$

$$390 \text{μm} \leq T_A \leq 750 \text{μm};$$

$$0.19 \leq (W_A + W_B)/W_D \leq 0.28; \text{ and}$$

$$1.58 \leq W_C/(W_A + W_B) \leq 1.85;$$

$W_A$ is the weight of the positive electrode layer (A);
$W_B$ is the weight of the negative electrode layer (B);
$T_A$ is the thickness of the positive electrode in which the positive electrode layer (A) is formed;
$W_D$ is the weight of the accumulator device (D); and
$W_C$ is the weight of the electrolytic solution (C).

2. The accumulator device according to claim 1, wherein the accumulator device (D) satisfies $500 \leq \sqrt{(T_A^2 \times W_A/W_B)} \leq 1000$.

3. The accumulator device according to claim 1, wherein:
the accumulator device (D) satisfies $100 \text{ μm} \leq T_B \leq 300 \text{ μm}$; and
$T_B$ is the thickness of the negative electrode in which the negative electrode layer (B) is formed.

4. The accumulator device (D) according to claim 1, comprising a laminated-type electrode unit or a wound-type electrode unit.

5. The accumulator device (D) according to claim 4, comprising a laminated-type electrode unit or a wound-type electrode unit in which the positive electrode and the negative electrode are laminated or wound with a separator interposed therebetween;
wherein the positive electrode comprises a plurality of current collectors with holes penetrating across front and back surfaces, the plurality of current collectors being laminated with the positive electrode layer interposed therebetween.

6. The accumulator device according to claim 1, serving as a lithium ion capacitor.

7. The accumulator device (D) according to claim 1, wherein:

the accumulator device (D) satisfies:

$$0.19 \leq (W_A+W_B)/W_D \leq 0.28; \text{ and}$$

$$1.58 \leq W_C/(W_A+W_B) \leq 1.85;$$

$W_D$ is the weight of the accumulator device (D); and
$W_C$ is the weight of the electrolytic solution (C).

8. An accumulator device (D), comprising:
a positive electrode in which a positive electrode layer (A) is formed;
a negative electrode in which a negative electrode layer (B) is formed; and
an electrolytic solution (C);
wherein:
the accumulator device (D) satisfies:

$$1.02 \leq W_A/W_B \leq 2.08;$$

$$390 \mu m \leq T_A \leq 750 \mu m; \text{ and}$$

$$500 \leq \sqrt{(T_A^2 \times W_A/W_B)} \leq 1000;$$

$W_A$ is the weight of the positive electrode layer (A);
$W_B$ is the weight of the negative electrode layer (B); and
$T_A$ is the thickness of the positive electrode in which the positive electrode layer (A) is formed.

9. The accumulator device according to claim 8 or claim 7, wherein:

the accumulator device (D) satisfies $100 \mu m \leq T_B \leq 300 \mu m$; and $T_B$ is the thickness of the negative electrode in which the negative electrode layer (B) is formed.

10. The accumulator device (D) according to claim 8 or claim 7, comprising a laminated-type electrode unit or a wound-type electrode unit.

11. The accumulator device (D) according to claim 10, comprising a laminated-type electrode unit or a wound-type electrode unit in which the positive electrode and the negative electrode are laminated or wound with a separator interposed therebetween;

wherein the positive electrode comprises a plurality of current collectors with holes penetrating across front and back surfaces, the plurality of current collectors being laminated with the positive electrode layer interposed therebetween.

12. The accumulator device according to claim 8 or claim 7, serving as a lithium ion capacitor.

* * * * *

UNITED STATES PATENT AND TRADEMARK OFFICE
CERTIFICATE OF CORRECTION

| | | |
|---|---|---|
| PATENT NO. | : 9,287,058 B2 | Page 1 of 1 |
| APPLICATION NO. | : 14/005472 | |
| DATED | : March 15, 2016 | |
| INVENTOR(S) | : Nobuo Ando et al. | |

It is certified that error appears in the above-identified patent and that said Letters Patent is hereby corrected as shown below:

On the title page, Item (73), the Assignee's Information is incorrect. Item (73) should read:

--(73) Assignee: JM Energy Corporation, Hokuto-city (JP)--

Signed and Sealed this
Seventeenth Day of May, 2016

Michelle K. Lee
*Director of the United States Patent and Trademark Office*